Dec. 4, 1923.  1,476,280
F. E. BOWDEN
COMBINATION BED, TABLE, AND ARTICLE CARRIER FOR AUTOMOBILES
Filed Nov. 21, 1922   3 Sheets-Sheet 1
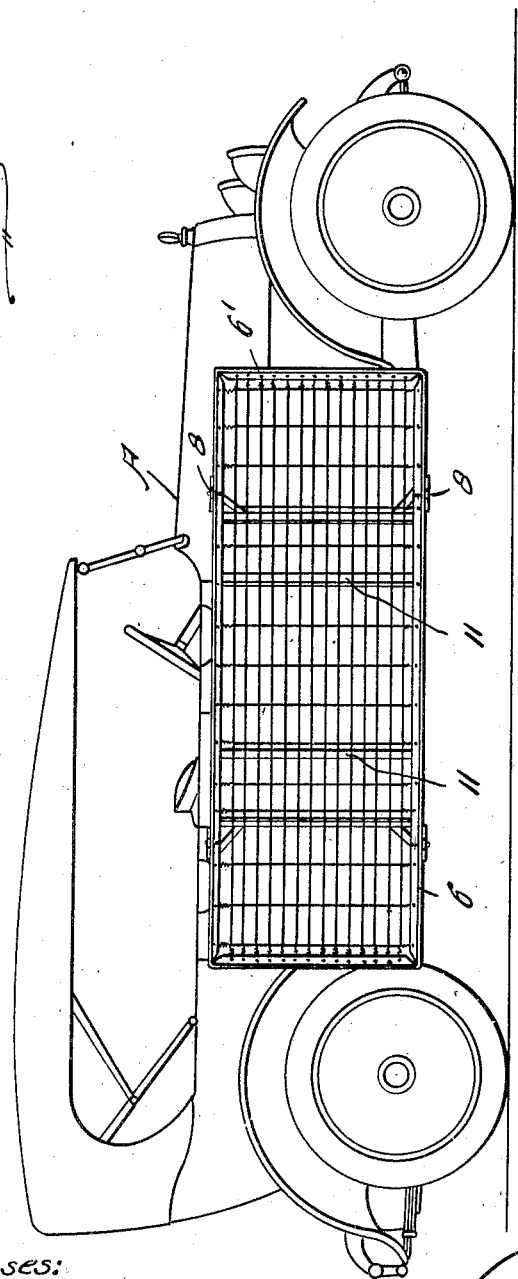
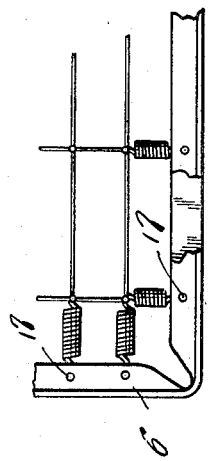
F. E. Bowden,
INVENTOR.
BY Clarence A. O'Brien
ATTORNEY.

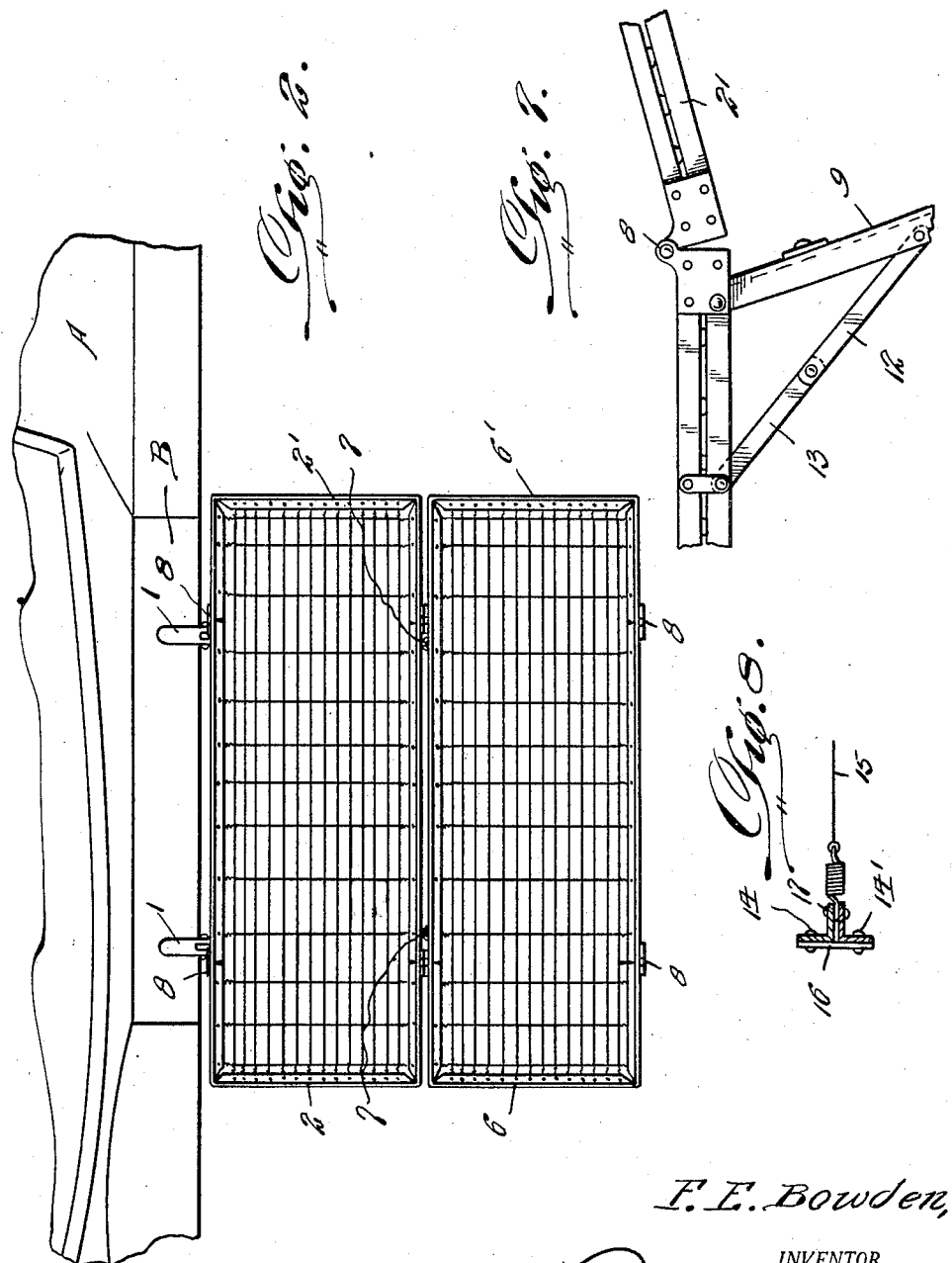

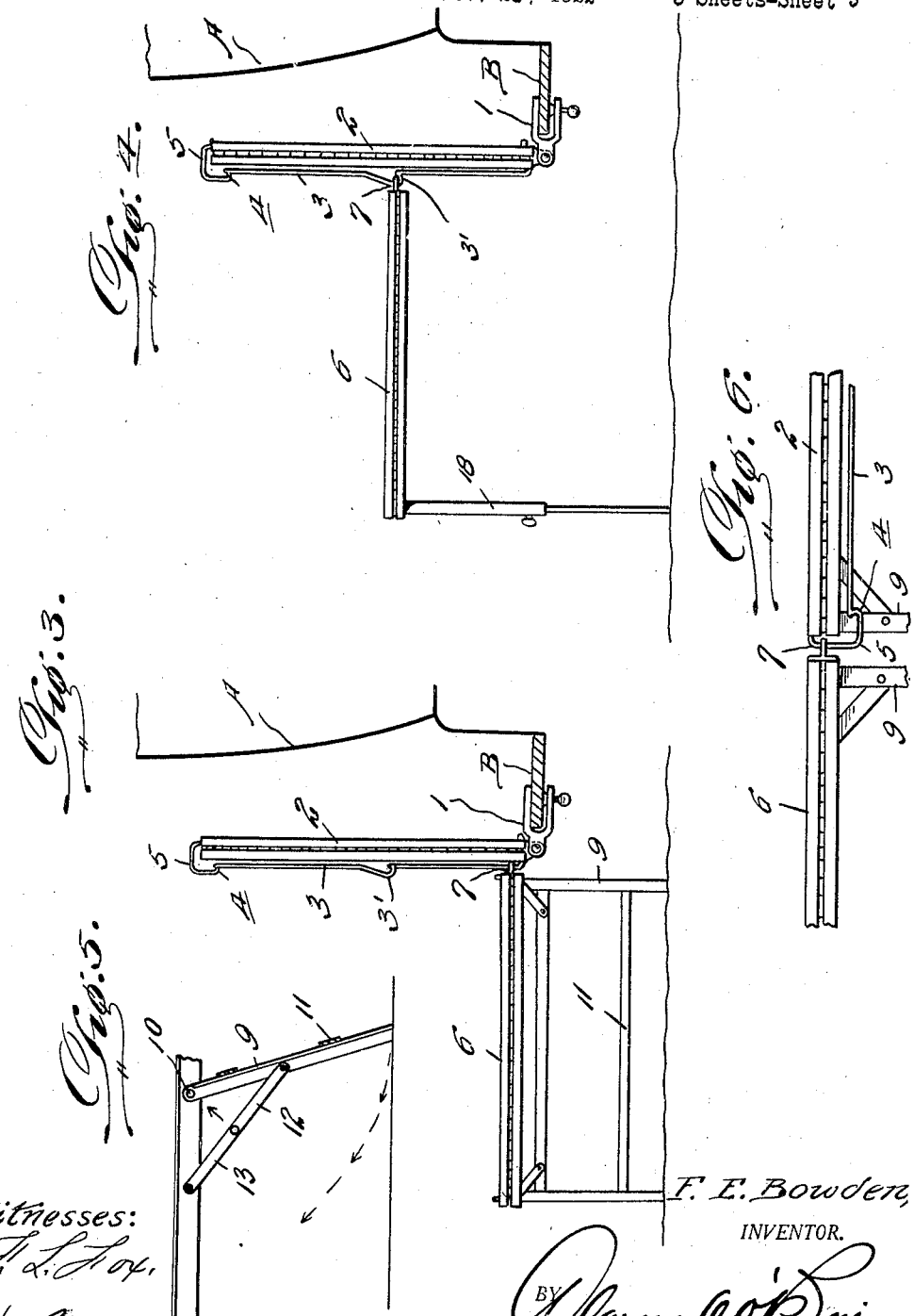

Patented Dec. 4, 1923.

1,476,280

UNITED STATES PATENT OFFICE.

FRANK E. BOWDEN, OF FRESNO, CALIFORNIA.

COMBINATION BED, TABLE, AND ARTICLE CARRIER FOR AUTOMOBILES.

Application filed November 21, 1922. Serial No. 602,380.

*To all whom it may concern:*

Be it known that I, FRANK E. BOWDEN, a citizen of the United States, residing at Fresno, in the county of Fresno and State of California, have invented certain new and useful Improvements in Combination Bed, Table, and Article Carriers for Automobiles, of which the following is a specification.

This invention relates to a combination bed, table and article carrier for ready attachment to the running boards of a motor vehicle to be used by automobilists whilst touring, and such an article that may be employed for the above described purposes in a simple and expeditious manner.

The nature and advantages of the invention will be better understood when the following detailed description is read in connection with the accompanying drawings, the invention residing in the construction, combination, and arrangement of parts as claimed.

In the drawings forming a part of this application, like numerals of reference indicate similar parts in the several views, and wherein:—

Figure 1 is a side elevational view of a convenient form of automobile showing my device attached to the running board thereof, and so folded thereon as to be employed as an article carrier.

Figure 2 is a top plan view of the device extended as to provide a desirable bed.

Figure 3 is an end elevational view of the device disclosing the same so positioned as to provide a single or rest bed.

Figure 4 is a view similar to Figure 3, disclosing the device employed as a table.

Figure 5 is a fragmentary cross sectional view disclosing more clearly, the folding end legs for the bed.

Figure 6 is a fragmentary enlarged end elevational view of the device setting forth the connection between the two folding members.

Figure 7 is an enlarged fragmentary end elevational view of one of the folding members setting forth an improved arrangement thereon for providing a head rest on the folding members when the same are employed as a bed.

Figure 8 is a detailed cross sectional view of one of the side rails of the folding members, and Figure 9 is an enlarged fragmentary top plan view of a portion of one of the bed members.

With particular reference to the drawings, there is disclosed in several of the figures any conventional type of automobile A and the usual running board B. Rigidly secured at spaced points upon the running board B are any desirable form of clamp members 1, and hingedly secured to these clamp members is a substantially rectangular-shaped bed section 2. Spaced inwardly of the outer ends of the bed section 2 and upon the bottom surface thereof are guide rods 3 formed or bent to provide a hook-shaped keeper portion 3' substantially intermediate the ends thereof. The upper ends of each of these guide rods are also bent as to provide a hook-shaped keeper 4, adjacent the upper end thereof, and also a looped portion 5 at the extreme upper end of each of the guide rods. Another similarly shaped bed section 6 has eye members 7 secured upon the inner side rail thereof, and at points adjacent each of the guide rods 3. These eye members are adapted to surround each of the guide rods and to have a free sliding movement thereon.

Hingedly secured to the front ends of the sections 2 and 6 as at 8 are head rests 2' and 6' respectively, more clearly shown in Figure 7. These head rests of each of the bed sections may be retained in an upwardly inclined position as shown in this figure in any manner desirable when the sections 2 and 6 are employed as a bed.

The opposite ends of each of the sections 2 and 6 have supporting legs 9 at the opposite ends thereof, and with particular reference to Figure 5, it will be noted that these legs are of angle iron formation hingedly secured at their upper ends as at 10 to the side rails of each of the bed sections.

The legs 9 at the ends of each of the bed sections are interconnected by cross bars 11, and pivotally secured at a point intermediate the ends of each of the legs 9 is a link 12, which is also pivotally secured at its opposite end to another link 13 which link is similarly pivotally secured to the side rail of the bed for retaining the end legs 9 in an extended position as shown in this figure, when each of the sections 2 and 6 are folded downwardly. It will be readily understood that when the connection between the links 12 and 13 is broken, the legs 9 may be swung upwardly in the direction of the arrows for positioning these leg members beneath the bed.

The side and end rails of each of the bed sections 2 and 6 include an upper and lower L-shaped angle iron 14 and 14' respectively, and secured between the adjacent faces of each of these angle irons are the ends of the spring wire members 15 comprising the bottom of the sections 2 and 6. For retaining the angle irons 14 and 14' together, there is riveted at spaced points upon the outer faces of these angle irons, link members 16, and as clearly shown in Figure 8, the wire strands 15 are retained between the angle irons by bolts or rivets 17.

At opposite ends of the front rail of the bed sections 6 there is hingedly secured in any manner desirable, telescopic supporting legs 18, which legs are adapted to be extended to a position as shown in Figure 4, when the said section 6 is employed as a table, and as clearly shown in this figure, the spaced rings or eyes 7 upon the inner rail of this bed section are adapted to be slid upwardly upon the guide rods 3 whereby these eyes or rings 7 may be retained within the hook portions 3' of the guide rods.

When the device is to be used as an article carrier as shown in Figure 1, the leg members 9 of the section 6 are folded inwardly upon the bottom of the bed, at which time, the ring members 7 of this section engage within the hook portions 4 of the guide rods 3 for allowing the section 6 to extend downwardly adjacent the section 2. When in this position, the sections 2 and 6 may be there retained in any manner desirable.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as new is:—

In combination, an inner bed section adapted to be hingedly secured to the running board of an automobile, an outer bed section slidably and hingedly secured to the inner section and adapted to be supported substantially intermediate the ends of the inner section when the same is vertically disposed upon the running board, the said sliding and hinge connections between the two sections permitting the inner section to be swung downwardly to extend parallel to the outer section for providing a bed and supporting means at the opposite ends of the outer section when the said sections are so disposed.

In testimony whereof I affix my signature.

FRANK E. BOWDEN.